United States Patent [19]

Roberts et al.

[11] Patent Number: 4,961,912

[45] Date of Patent: * Oct. 9, 1990

[54] PASSIVATION OF ELEMENTAL PHOSPHORUS CONTAINED IN WASTE PONDS

[75] Inventors: Auston K. Roberts, Chino; William E. Trainer, Anaheim, both of Calif.; Mark L. Blumenfeld, New York City, N.Y.; David L. Biederman, Columbia, Tenn.

[73] Assignee: Rhone-Poulenc Basic Chemicals Co., Shelton, Conn.

[ * ] Notice: The portion of the term of this patent subsequent to Aug. 11, 2004 has been disclaimed.

[21] Appl. No.: 140,059

[22] Filed: Dec. 31, 1987

Related U.S. Application Data

[63] Continuation-in-part of Ser. No. 78,426, Jul. 27, 1987, Pat. No. 4,746,499, which is a continuation-in-part of Ser. No. 894,529, Aug. 8, 1986, Pat. No. 4,686,094.

[51] Int. Cl.$^5$ ............... C01B 25/01; C01B 25/02; C01B 25/04
[52] U.S. Cl. ...................... 423/322; 423/323
[58] Field of Search .................. 423/322, 323

[56] References Cited

U.S. PATENT DOCUMENTS

| | | | |
|---|---|---|---|
| 4,492,627 | 1/1985 | Crea | 209/3 |
| 4,608,241 | 8/1986 | Barbe | 423/317 |
| 4,686,094 | 8/1987 | Roberts et al. | 423/322 |
| 4,746,499 | 5/1988 | Roberts et al. | 423/322 |

OTHER PUBLICATIONS

Barber et al., "A Waste Recovery Story", Chemtech, May 1986, pp. 299–302.

Primary Examiner—Gregory A. Heller
Attorney, Agent, or Firm—Paul J. Juettner

[57] ABSTRACT

Elemental phosphorus contained in waste ponds can be appropriately passivated to render them substantially less pyrophoric by bringing the elemental phosphorus-containing wastes into contact with an oxygen-containing gas. Substantially pure oxygen can be used to appropriately sparge the elemental phosphorus-containing wastes submerged in the waste pond. If desired, phosphorus values can be recovered in the form of an aqueous phosphate solution.

4 Claims, No Drawings

PASSIVATION OF ELEMENTAL PHOSPHORUS CONTAINED IN WASTE PONDS

RELATED APPLICATION

This is a continuation-in-part of U.S. Ser. No. 078,426, filed July 27, 1987, entitled "A Method of Decontaminating a Location Containing Pyrophoric $P_4$ Contamination", now U.S. Pat. No. 4,746,499, which is a continuation-in-part of U.S. Ser. No. 894,529, filed Aug. 8, 1986, entitled "Treatment of Pyrophoric Elemental Phosphorus-Containing Material", now U.S. Pat. No. 4,686,094, which issued on Aug. 8, 1987.

BACKGROUND OF THE INVENTION

Elemental phosphorus is a very pyrophoric material which ignites spontaneously when exposed to air. It is common practice to store elemental phosphorus wastes under water in waste ponds to prevent their contact with the atmosphere and thereby cause pyrotechnic incidents.

U.S. Pat. No. 4,492,627 to D. A. Orea describes a process for recovery of elemental phosphorus from waste ponds by dredging the waste pond to obtain an aqueous phosphorus slurry, separating particles larger than about 2 mm from the slurry, treating the remaining slurry in an initial hydrocyclone and removing an overflow of solids larger than 500 micrometers, treating the underflow from the initial hydrocyclone in a smaller diameter hydrocyclone, removing a second overflow enriched in slimes and diminished in phosphorus, removing a second underflow enriched in phosphorus and diminished in slimes and heating it sufficiently to melt the phosphorus contained therein, treating the heated second underflow in a centrifugal separator, and separating and recovering a stream of coalesced phosphorus from a heavy fraction of impurities.

U.S. Pat. No. 4,608,241 indicates that phosphorus-containing wastes can be recycled to a phosphorus furnace for burning in air.

Finally, "A Waste Recovery Story" by J. C. Barber et al., which appeared in Chemtech, May 1986, pages 298–302, indicates that phosphorus sludge can be kept submerged in ponds to prevent it from burning. It also indicates that a process has been proposed for separating elemental phosphorus from the solids, wherein phosphorus and water are distilled off, leaving a solid residue which contains no elemental phosphorus. The residue, which contains relatively high amounts of $P_2O_5$, is fed back to a furnace. It also proposes a process in which the phosphoruscontaining waste would be oxidized with air and hydrated with water to make a mixture of acids suitable for use in preparing agglomerated feed materials. Phosphate ore or reducing carbon could be agglomerated by the thus described low-temperature process, and the toxic chemicals could be smelted according to this publication.

SUMMARY OF THE PRESENT INVENTION

The present invention involves a novel way in which the elemental phosphorus values contained in waste ponds can be passivated, thereby rendering them substantially less pyrophoric. In accordance with the present invention, an oxygen-containing gas is fed into the aqueous covering layer holding the elemental phosphorus in the waste pond so that the oxygen in the oxygen-containing gas reacts with the elemental phosphorus converting it to a substantially less pyrophoric form.

DETAILED DESCRIPTION OF THE PRESENT INVENTION

The present invention is understood by reference to U.S. Pat. No. 4,686,094, the entire text of which is incorporated herein by reference. This patent, although not specifically concerned with the problem of treatment of elemental phosphorus-containing waste ponds, is directed to a procedure whereby elemental phosphorus-containing material, which is blanketed by an appropriate blanketing fluid (e.g., water), is treated with an oxygen-containing gas to render it substantially less pyrophoric. Although the description in this patent is made in connection with elemental phosphorus values contained in a tank, that procedure also finds differing and specific utility in connection with the passivation of phosphorus contained in waste ponds as described below. In accordance with the present invention, the oxygen-containing gas that is used is preferably substantially pure oxygen since such a gas is deemed to be capable of giving the best results in regard to the speed and ease in which the elemental phosphorus in the waste ponds can be passivated. However, it is also deemed to be in accordance with the invention if mixtures of pure oxygen with a suitable inert gas (e.g., nitrogen) are used in appropriate cases. Air can also be used either alone or in admixture with nitrogen, if desired. Once the elemental phosphorus in the waste pond or ponds has been passivated, phosphorus values can be recovered (e.g., in the form of aqueous phosphate solutions) as indicated in U.S. Pat. No. 4,686,094 for the differing procedure disclosed therein.

The present invention is further articulated by the claims which follow.

We claim:

1. A process for the passivation of elemental phosphorus-containing wastes contained in waste ponds rendering them substantially less pyrophoric, which comprises bringing the elemental phosphorus-containing wastes contained in the waste pond in contact with an oxygen-containing gas to render them substantially less pyrophoric.

2. A process as claimed in claim 1 wherein the oxygen-containing gas is substantially pure oxygen.

3. A process as claimed in claim 1 wherein elemental phosphorus values are recovered in the form of an aqueous phosphate solution.

4. A process as claimed in claim 2 wherein elemental phosphorus values are recovered in the form of an aqueous phosphate solution.

* * * * *